United States Patent [19]
Gil

[11] Patent Number: 5,846,360
[45] Date of Patent: Dec. 8, 1998

[54] FILTER AND METHOD AND APPARATUS FOR MANUFACTURE THEREOF

[76] Inventor: George Gil, 628 Tillinghast Rd., East Greenwich, R.I. 02818

[21] Appl. No.: 781,121

[22] Filed: Jan. 9, 1997

[51] Int. Cl.⁶ .................................................. B32B 31/16
[52] U.S. Cl. ..................... 156/73.1; 156/201; 156/580.2; 264/444
[58] Field of Search .................... 156/73.1, 196, 156/199, 200, 201, 580.2, 580.1; 55/482, 485; 264/442, 443, 444

[56] References Cited

U.S. PATENT DOCUMENTS

| | | | |
|---|---|---|---|
| 1,164,591 | 12/1915 | Alexander | 156/383 |
| 1,921,495 | 8/1933 | Winter | 19/145 |
| 2,591,490 | 4/1952 | Allen | 55/514 |
| 2,599,625 | 6/1952 | Gilman | 156/383 |
| 3,546,846 | 12/1970 | Sens | 53/433 |
| 4,129,430 | 12/1978 | Snow | 55/485 |
| 4,305,988 | 12/1981 | Köcher | 428/158 |
| 4,333,978 | 6/1982 | Kocher | 428/158 |
| 4,518,402 | 5/1985 | Dargel | 55/103 |
| 4,555,342 | 11/1985 | Grant | 210/488 |
| 4,605,454 | 8/1986 | Sayovitz et al. | 156/73.1 |
| 4,659,614 | 4/1987 | Vitale | 428/218 |
| 4,686,136 | 8/1987 | Homonoff et al. | 156/73.1 |
| 4,812,189 | 3/1989 | Regipa | 156/201 |
| 4,886,527 | 12/1989 | Fottinger et al. | 55/156 |
| 4,930,904 | 6/1990 | Gröner | 383/45 |
| 4,933,231 | 6/1990 | Seber . | |
| 5,215,609 | 6/1993 | Sanders . | |

*Primary Examiner*—James Sells
*Attorney, Agent, or Firm*—Fishman, Dionne, Cantor & Colburn

[57] ABSTRACT

A filter and method and apparatus for manufacturing the filter. The filter includes a first filter layer and a second filter layer. The first and second filter layers are joined by a ribbon. The ribbon is attached to the first filter layer and the second filter layer through ultrasonic welding. The apparatus includes first and second ultrasonic welders for attaching the first filter layer to one end of the ribbon and the second filter layer to the other end of the ribbon.

15 Claims, 12 Drawing Sheets

FILTER AND METHOD AND APPARATUS FOR MANUFACTURE THEREOF

BACKGROUND OF THE INVENTION

1. Field of the Invention

The invention relates in general to air filters and in particular to an air filter having two filter layers ultrasonically welded to a ribbon and a method and apparatus for the manufacture thereof.

2. Prior Art

Figure 1:
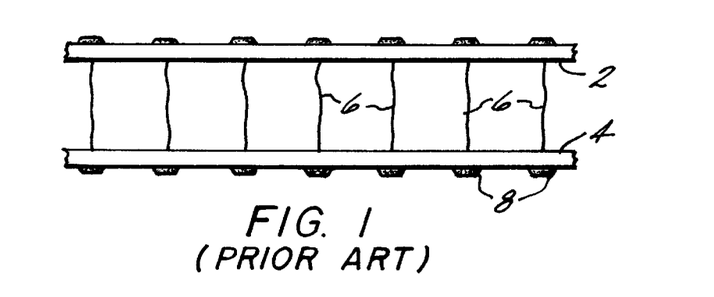
FIG. 1 is a side view of a conventional air filter.
Figure 2:
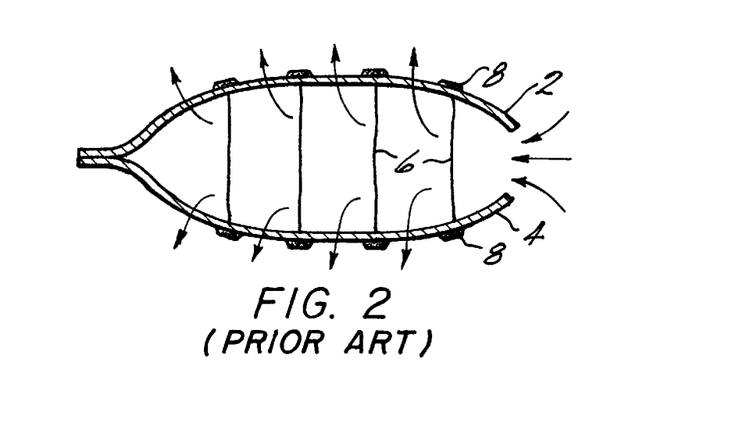
FIG. 2 is a cross-sectional view of a conventional air filter bag.

Air filters are used to eliminate particles such as dirt, dust, smoke etc. from air that passes through the filter. Air filter bags are structures made from a filter media that capture particles and hold the particles in a confined space. Air filter bags facilitate disposal of the particles since the particles are captured within the bag body. A conventional air filter construction is shown in FIG. 1. As shown in FIG. 1, the air filter bag includes a first filter layer 2 and a second filter layer 4. The first filter layer and the second filter layer are joined by threads 6 which are sewn through the first filter layer 2 and the second filter layer 4. The sewing process creates holes in the filter layers and thus an adhesive 8 is applied over the areas that have been sewn. The filter layers may be joined, leaving an opening for the entrance of air, to form a filter bag as shown in FIG. 2. The threads 6 hold the air filter bag together as air passes though the filter layers 2 and 4.

Figure 3:
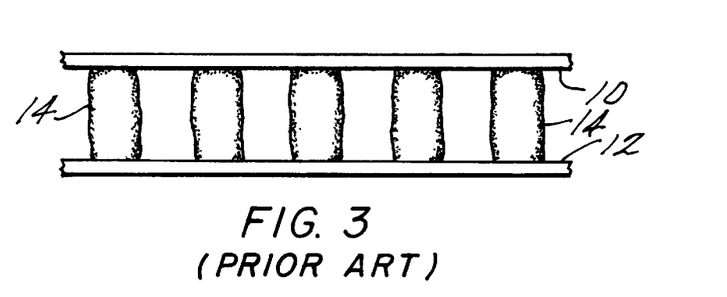
FIG. 3 is a side view of another conventional air filter.

Another conventional air filter construction is shown in FIG. 3. As shown in FIG. 3, the air filter is made up of a first filter layer 10 and a second filter layer 12. The first and second filter layers are joined by a series of tubes 14 made from a non-woven material. The tubes 14 are connected to the first and second filter layers using an adhesive.

The conventional filter constructions have several disadvantages. The sewn filter construction shown in FIG. 1 requires the addition of an adhesive to seal needle holes formed in the air filter layers. This increases the cost and complexity of manufacturing the filter. The filter construction shown in FIG. 3 requires forming tubes of non-woven material and connecting the tubes to the filter layers through an adhesive. Again, this increases the cost and complexity of manufacturing the filter.

SUMMARY OF THE INVENTION

The above-discussed and other drawbacks and deficiencies of the prior art are overcome or alleviated by the filter having two filter layers ultrasonically welded to a ribbon and a method and apparatus for the manufacture thereof of the present invention. The filter includes a first filter layer and a second filter layer. The first and second filter layers are joined by a ribbon. The ribbon is attached to the first filter layer and the second filter layer through ultrasonic welding. The apparatus for manufacturing the filter includes a first and second ultrasonic welding station for attaching the first filter layer to one end of the ribbon and the second filter layer to the other end of the ribbon.

The use of ultrasonic welding to attach the filter layers to the ribbon eliminates the need for adhesives. This reduces the cost and complexity of the manufacturing. In addition, the manufacturing is automated thereby further reducing the cost of the filter.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 4:
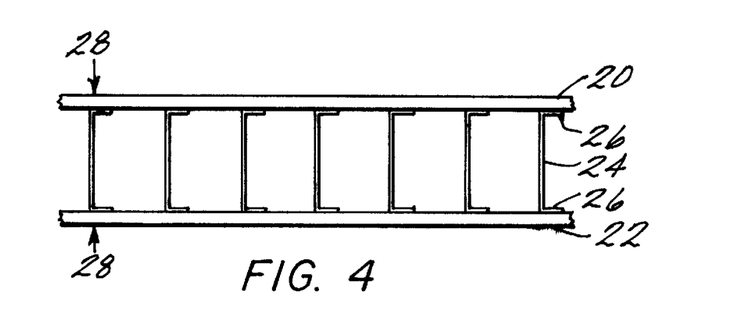
FIG. 4 is a side view of the filter construction in the present invention.

FIG. 4 is a side view of a filter construction in accordance with the present invention. The filter is made up of a first filter layer 22 and a second filter layer 20. The first filter layer and the second filter layer may be constructed from non-woven material. The filter layers 20 and 22 are connected by a ribbon of material 24 (e.g. non-woven material). The ribbon 24 includes a bent section 26 at each end. The bent section 26 provides a surface to which the filter layers 20 and 22 are ultrasonically welded to the ribbon 24. The ultrasonic welding is performed at each bent section 26 as indicated by arrows 28. The manufacturing process is simplified in that adhesives are not necessary. In addition, as described below, the manufacturing is automated thereby reducing complexity and costs.

Figure 5:
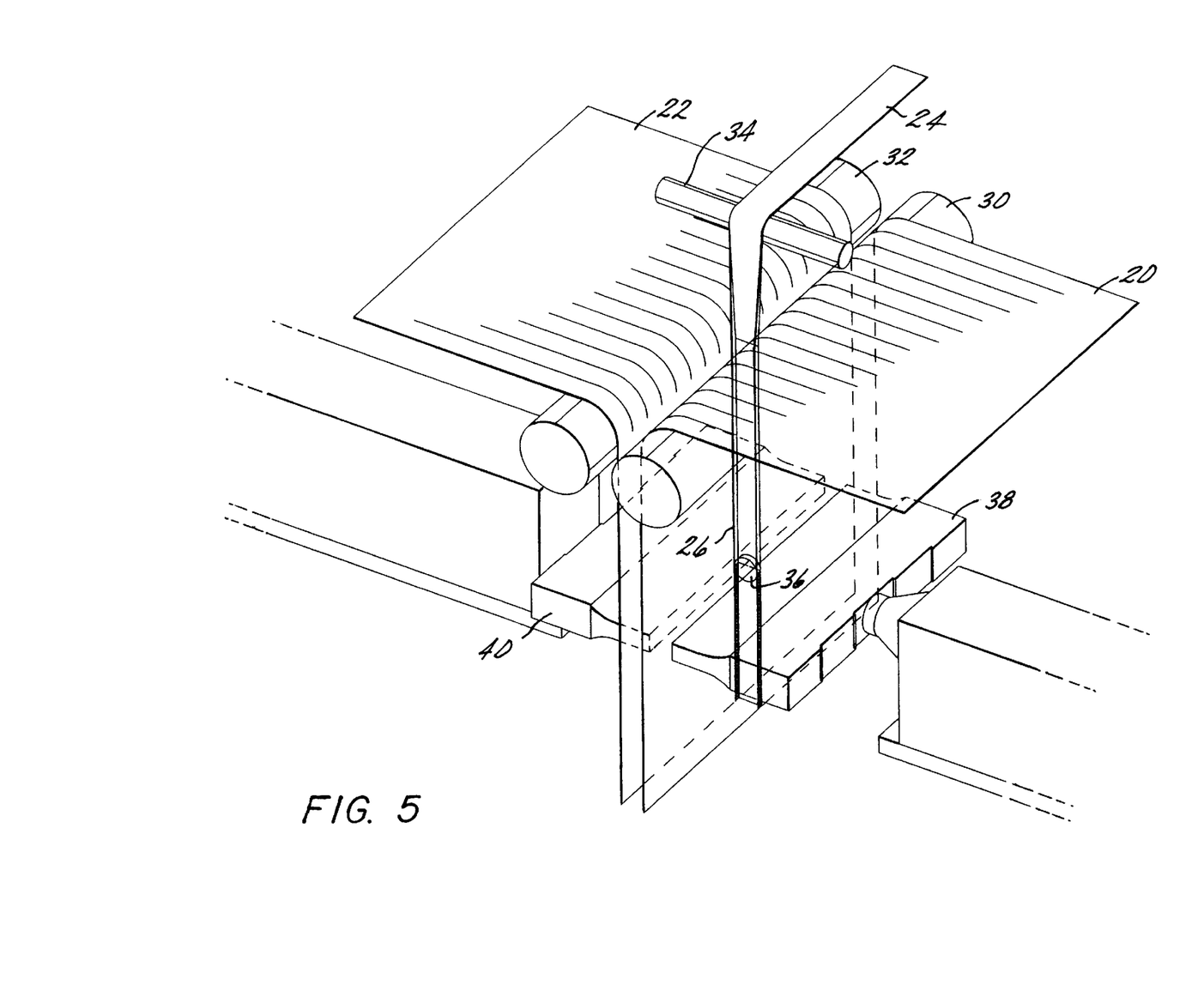
FIG. 5 is a perspective view illustrating the process used to manufacture the filter shown in FIG. 4.

FIG. 5 is a perspective view illustrating the manufacturing process for manufacturing the filter shown in FIG. 4. As shown in FIG. 5, the first filter layer 22 and the second filter layer 20 are drawn over rollers 30 and 32 by a drive mechanism described in detail below. The ribbon 24 is drawn over a roller 34 by the same drive mechanism. As the ribbon 24 approaches ultrasonic welding heads 38 and 40, the ribbon 24 is folded into a U-shape (as described below) and then engages an anvil 36. The ultrasonic welders 38 and 40 then weld the first filter layer 22 and the second filter layer 20 to the ribbon 24 at the bent section 26.

Figure 6:
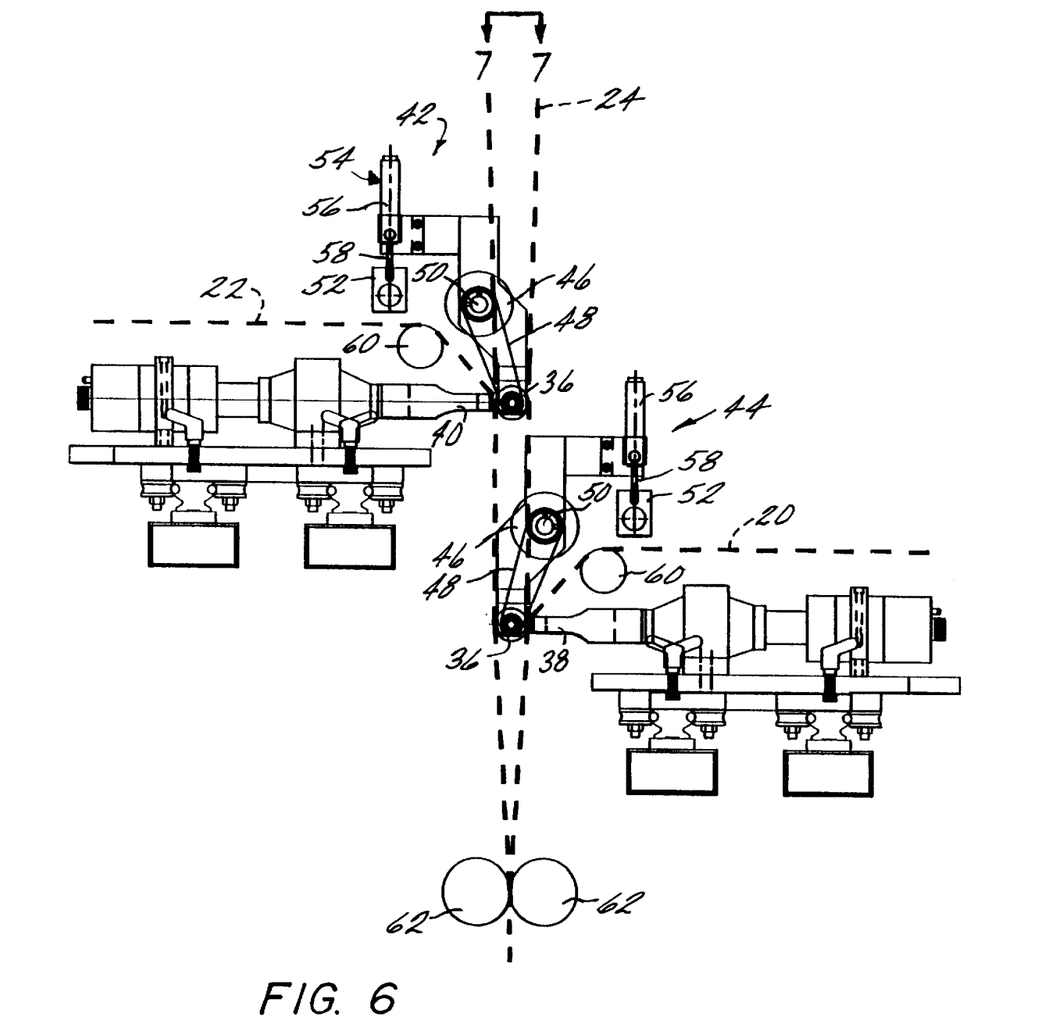
FIG. 6 is a front view of a portion of the apparatus for manufacturing the filter shown in FIG. 4.

FIG. 6 is a front view of a portion of the apparatus for manufacturing the filter shown in FIG. 4. FIG. 6 is a simplified view of the apparatus. As shown in FIG. 6, the apparatus includes two welders 38 and 40 for attaching the ribbon 24 to the filter layers 20 and 22. Prior to reaching the first welder 40, the ribbon passes through a first folder assembly shown generally at 42. The first folder assembly 42 folds the ribbon 24 into a U-shaped channel so that a first bent section 26 (shown in FIG. 4) can be welded to the first filter layer 22. The first folder assembly 42 includes an anvil 36 which is driven by an anvil drive pulley 46 through anvil drive belt 48. The anvil drive pulley 46 is driven by a motor shown in FIG. 8.

The first folder assembly 42 also includes an arm 54 made up of cylinder 56 and extension 58 that travels in or out of the cylinder based on pressure provided to the cylinder 56 (pneumatic, hydraulic, etc.). On end of the arm 54 is mounted to an arm support 52. The entire first folder assembly 42 is rotatably mounted on first folder assembly shaft 50 so that movement of extension 58 out of the cylinder 56 will cause the anvil 36 to move towards the welder 40 pressing the bent section 26 and the first filter layer 22 against the first welder 40. Conversely, movement of extension 58 in to cylinder 56 will cause the anvil 36 to move away from the welder 40. The second folder assembly 44 includes similar components but uses a different folder as will be described below.

Figure 7:
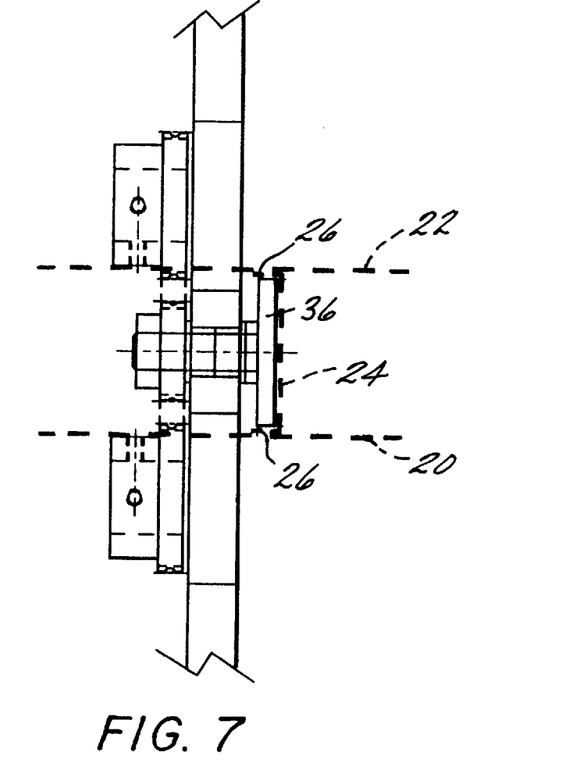
FIG. 7 is a top view taken along line 7—7 of FIG. 6.

Operation of the apparatus will now be described. An operator first threads the apparatus by drawing the second filter layer 20 over an idler 60, past the welder 38 between the end of the welder 38 and the anvil 36, and into a pair of pinch rollers 62. Similarly, the first filter layer 22 is drawn over idler 60, past the welder 40 between the end of the welder 40 and the anvil 36, and into the pair of pinch rollers 62. The ribbon 24 is drawn through a first folder (described in more detail below) which forms bent section 26 (shown in FIG. 4). The ribbon 24 is placed about the first folder assembly anvil 36 so that the bent sections 26 are adjacent to the periphery of the anvil 36 as shown in FIG. 7. The ribbon is then drawn through a second folder which forms the second bent section 26. The ribbon is placed about the second folder assembly anvil 36 as shown in FIG. 7. Lastly, the ribbon 24 is placed between the pinch rollers 62.

When manufacturing is commenced, the first filter layer 22, the second filter layer 20 and the ribbon 24 are all drawn through the apparatus by pinch rollers 62. The arms 54 are actuated through pressure (hydraulic, pneumatic, etc.) so that extension 58 moves out of the cylinder 54 and the anvils 36 in the first folder assembly and second folder assembly are pressed against the first welder 40 and second welder 38. The welders 38 and 40 attached the bent sections 26 to the first and second filter layers to form the filter shown in FIG. 4.

Figure 8:
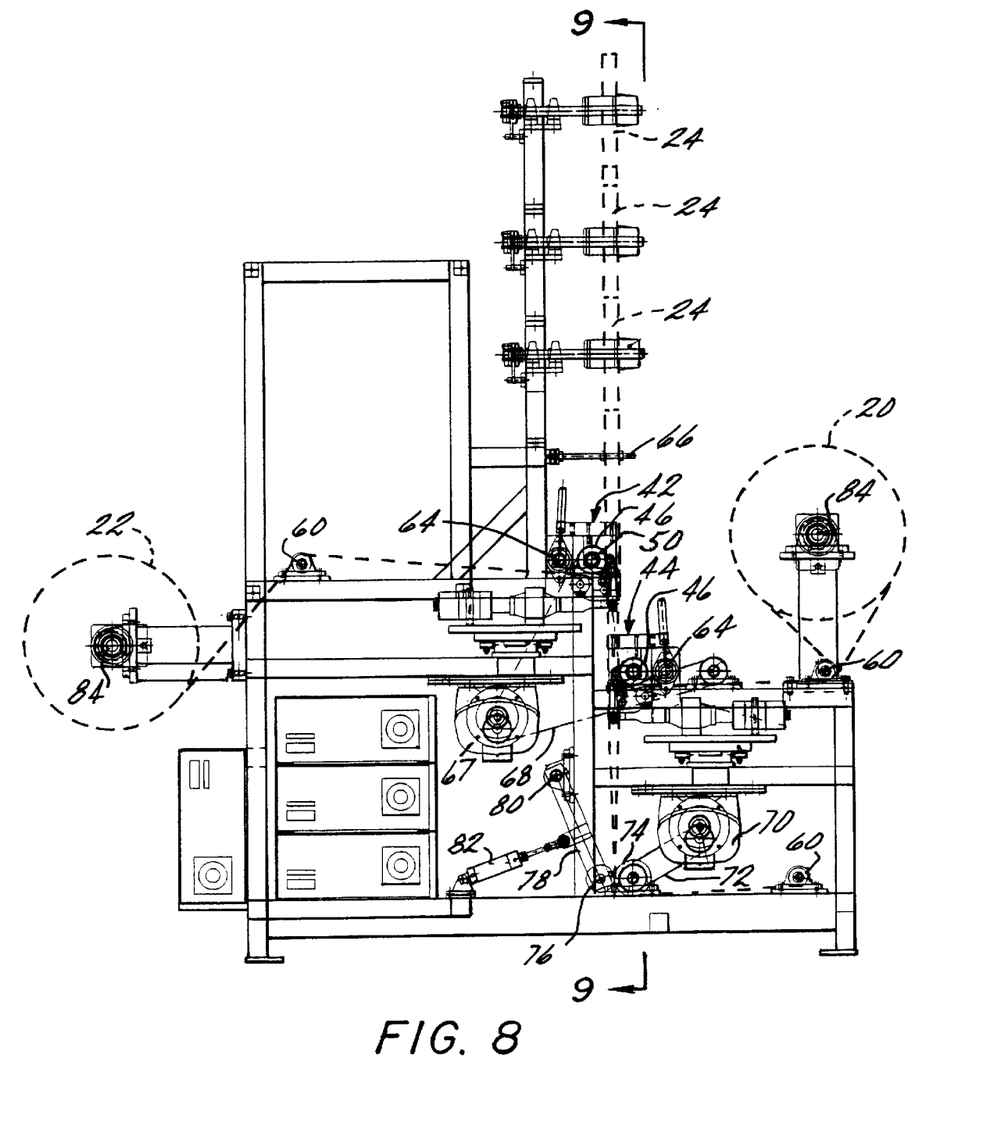
FIG. 8 is a front view of the apparatus for manufacturing the filter shown in FIG. 4.
Figure 9:
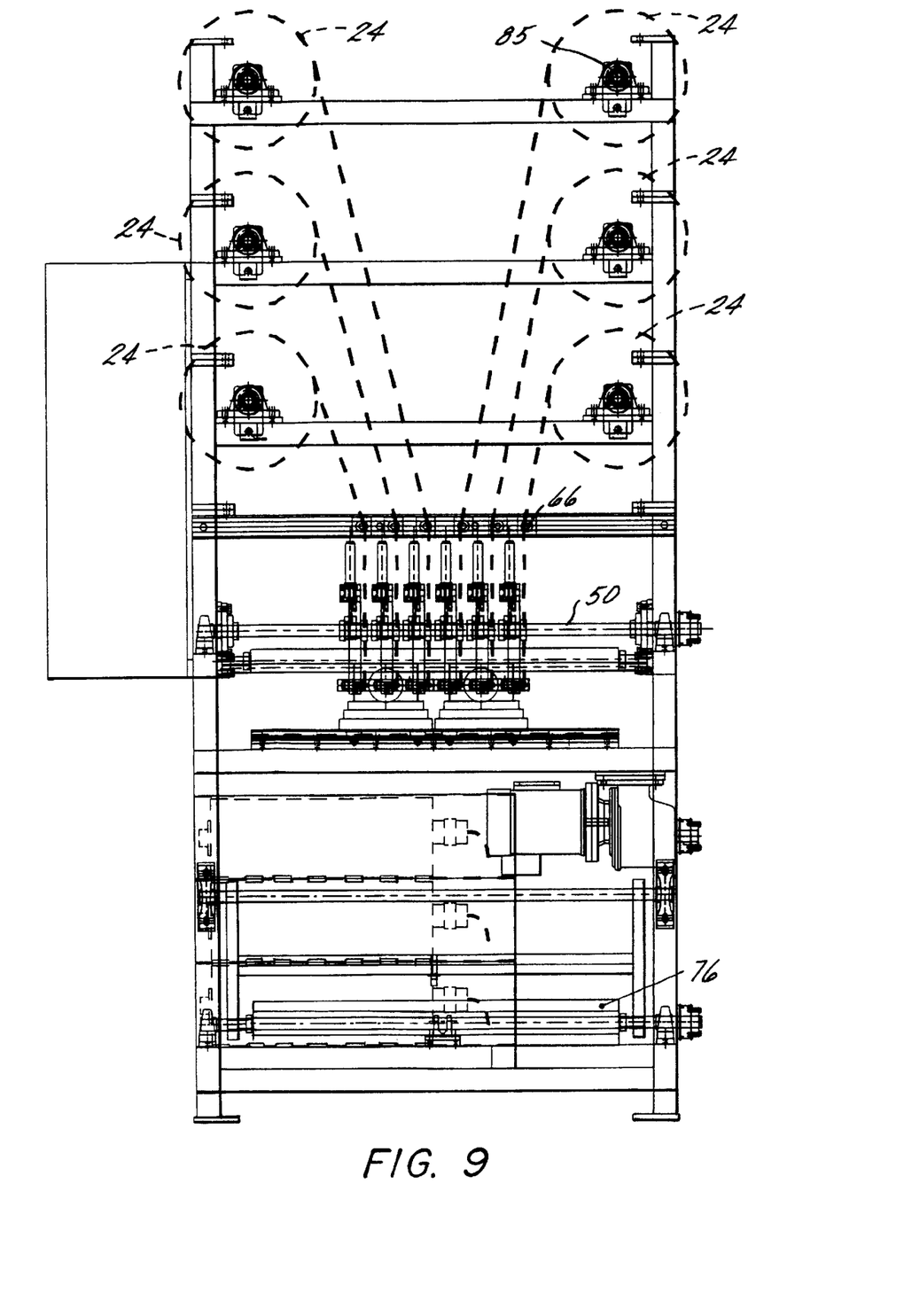
FIG. 9 is a cross-sectional view taken along line 9—9 of FIG. 8.

FIG. 8 is a front view of the apparatus for manufacturing the filter shown in FIG. 4. The first filter layer 22 and the second filter layer 20 are stored in rolls mounted on spindles 84. The embodiment shown in FIG. 8 provides six ribbons 24, as shown in FIG. 9. It is understood that more or less ribbons may be used in construction of the filter. The first filter layer 22, the second filter layer 20 and the ribbons 24 are all drawn through the apparatus by a pinch roller assembly. Motor 70 drives a rubber coated roller 74 through belt 72. A pinch roller 76 squeezes the first filter layer 22, the second filter layer 20 and the ribbons 24 against the rubber coated roller 74. The pinch roller 76 is connected to one end of an arm 78. The opposite end of arm 78 is pivotally mounted through shaft 80 to the frame of the apparatus. An arm 82 moves the pinch roller 76 towards or away from the rubber coated roller 74 to force the assembled filter against the rubber coated roller 74. The arm 82 may be driven by a variety of pressure sources (e.g. air, fluid, etc.).

As described above, each anvil 36 in the first folder assembly 42 and the second folder assembly 44 is driven by an anvil drive pulley 46 shown in FIG. 5. The anvil drive pulleys 46 positioned in the first folder assembly 42 and the second folder assembly 44 are driven by a motor 67 and a belt 68. All the anvil drive pulleys 46 in the multiple first folder assemblies 42 are connected to a first folder assembly shaft 50 and thus turning the anvil drive pulley at one end of shaft 50 turn all the anvil drive pulleys 46 in the first folder assemblies 44. The anvil drive pulleys 46 in the second folder assembly 44 are similarly connected to a common second folder assembly shaft 50.

FIG. 9 is a cross sectional view taken along line 9—9 of FIG. 8. As shown in FIG. 9, the apparatus includes six ribbon spindles 85 for holding spools of ribbon 24. Each ribbon passes over a ribbon guide 66 that aligns the ribbon 24 with the appropriate first folder assembly 42. A first folder assembly 42 and a second folder assembly 44 is provided for each ribbon 24. Each arm support 52, shown in FIG. 6, for each first folder assembly 42 and second folder assembly 44, is mounted on support shafts 64 shown in FIG. 8.

Figure 10:
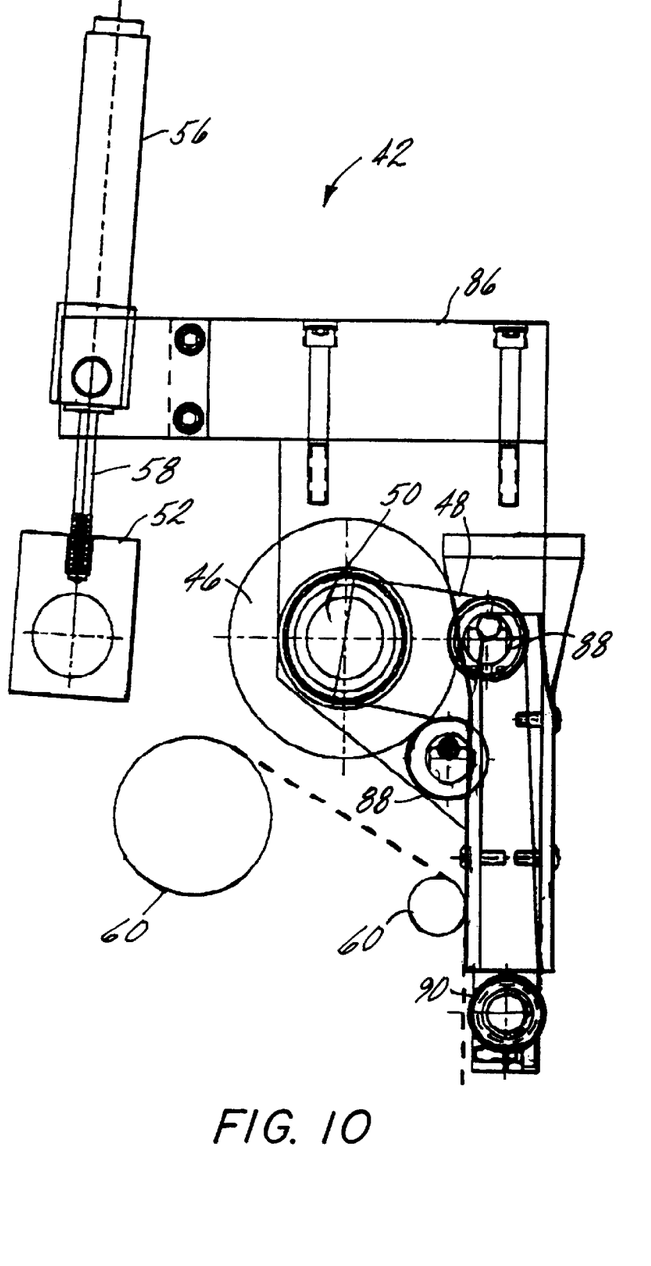
FIG. 10 is a front view of a first folder assembly.
Figure 11:
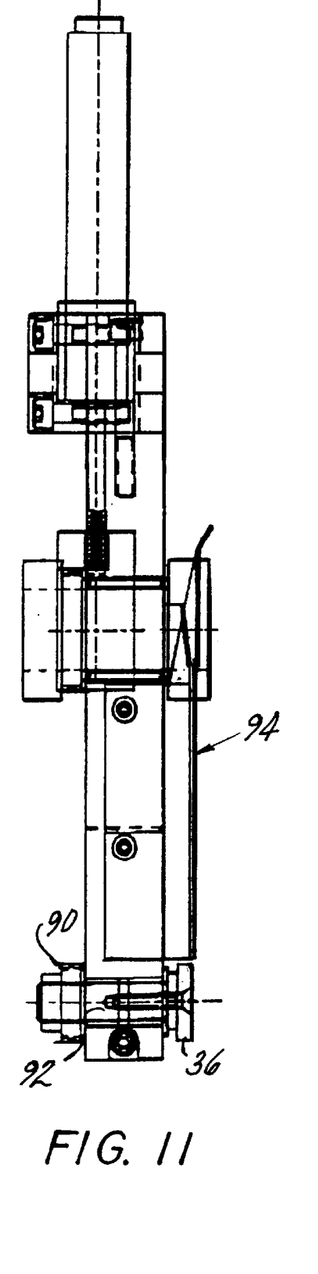
FIG. 11 is a side view of the first folder assembly.

FIG. 10 is an enlarged view of the first folder assembly 42. A first folder assembly bracket 86 provides the support for the various components. The anvil drive pulley 46 turns an anvil drive gear 90 through anvil drive belt 48 which passes over guide rollers 88. The anvil 36 is rotatably mounted to the bracket 86 through a pin 92 connected to the anvil 36 at one end and the anvil drive gear 90 at the other end as shown in FIG. 11. First folder 94 receives ribbon 24 and creates the U-shape described above. The first folder 94 and anvil 36 are positioned on one side of the bracket 86 and the anvil drive pulley 46, anvil drive belt 48, guide rollers 88 and anvil drive gear 90 are located on the other side of bracket 86.

Figure 12:
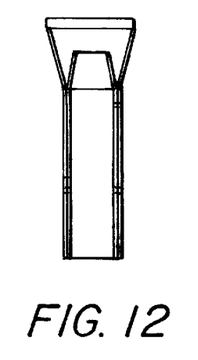
FIG. 12 is a front view of a first folder.
Figure 13:
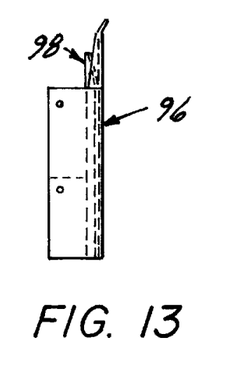
FIG. 13 is a side view of the first folder.
Figure 14:
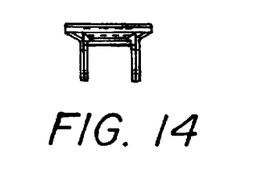
FIG. 14 is a top view of the first folder.
Figures 15, 16, 17:
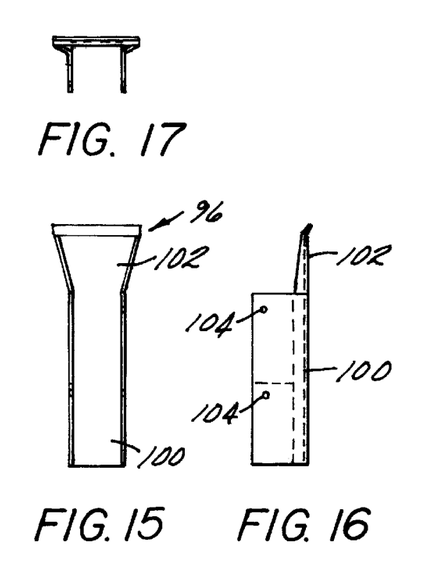
FIG. 15 is a front view of an exterior channel in the first folder.
FIG. 16 is a side view of the exterior channel.
FIG. 17 is a top view of the exterior channel.

The first folder 94 is shown in detail in FIGS. 12–20. FIG. 12–14 are front, side and top views, respectively, of the first folder 94. As shown in FIG. 13, the first folder includes an exterior channel 96 and an interior channel 98 positioned within the exterior channel. The combined exterior channel and interior channel form a U-shaped channel which bends the flat ribbon 24 into the U-shaped ribbon as described above. The exterior channel 96 is shown in FIGS. 15–17. As shown in FIGS. 15–17, the exterior channel 96 includes a U-shaped portion 100 and an extension 102. The extension 102 is substantially parallel to the back of the U-channel 100. Holes 104 are provided in the sides of the U-channel 100 to mount the interior channel 98 in the exterior channel 96.

Figures 18, 19, 20:
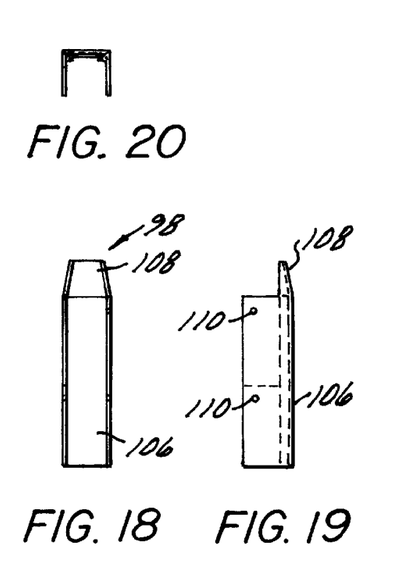
FIG. 18 is a front view of an interior channel in the first folder.
FIG. 19 is a side view of the interior channel.
FIG. 20 is a top view of the interior channel.

FIGS. 18–20 are front, side and top views, respectively, of the interior channel 98. The interior channel 98 includes a U-shaped portion 106 and an extension 108. The extension 108 is at an oblique angle relative to the back of the U-shaped portion 106. The angled extension 108 makes it easier to place the ribbon in the first folder 94 by providing a larger opening where the ribbon 24 enters the first folder 94. Holes 110 are provided in the U-shaped portion 106 for mounting the interior channel 98 to the exterior channel 96. The width of the U-shaped portion 100 of the exterior channel 96 is less than the width of the ribbon. Thus, the ribbon must bent to fit through the exterior channel 96. The ribbon 24 is placed in the first folder 94 so that bent sections 26 are formed.

Figure 21:
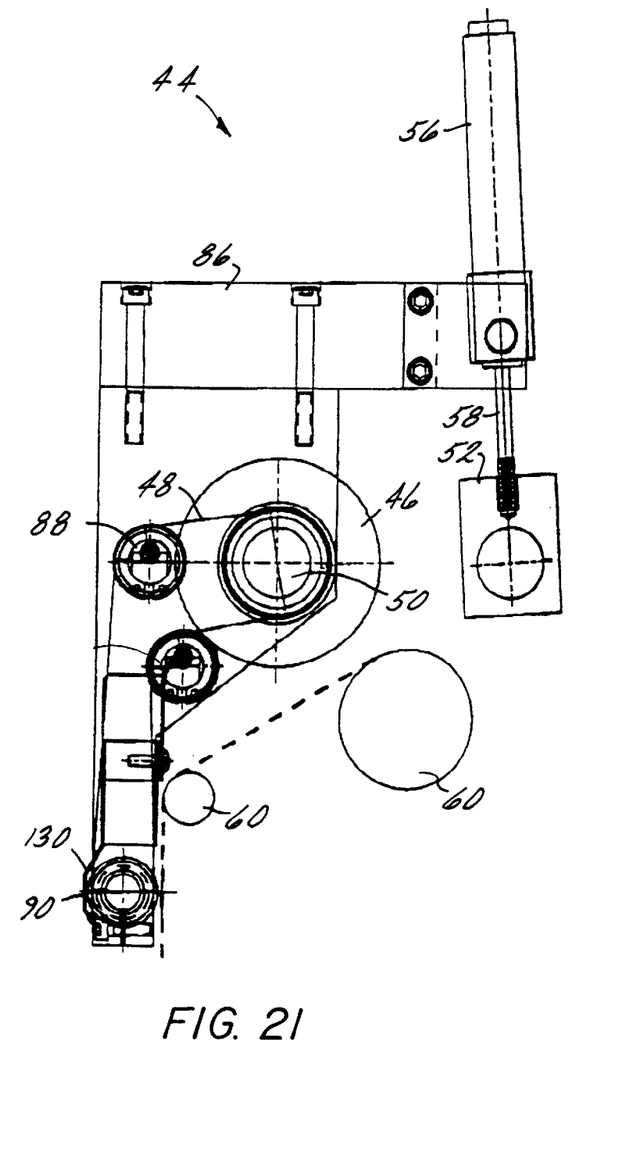
FIG. 21 is a front view of the second folder assembly.
Figure 22:
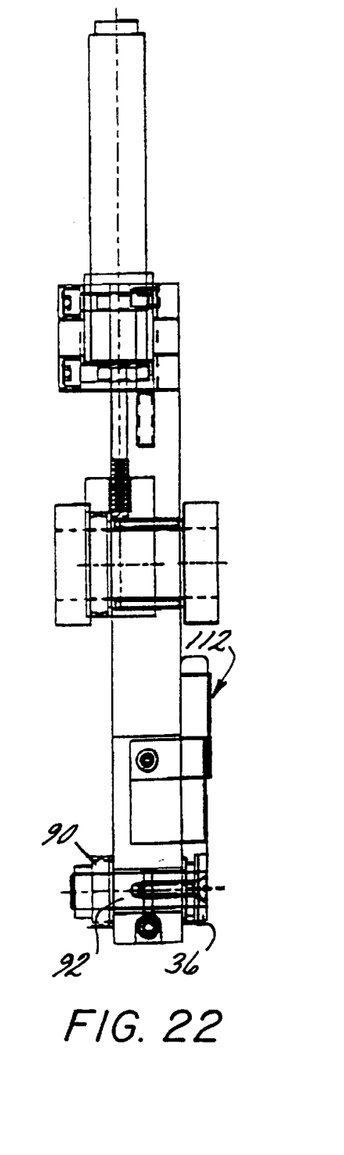
FIG. 22 is a side view of the second folder assembly.
Figure 23:
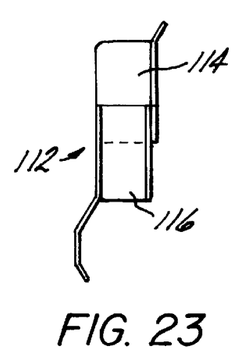
FIG. 23 is a front view of a second folder.
Figure 24:
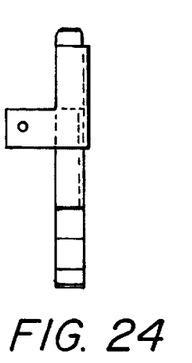
FIG. 24 is a side view of the second folder.
Figure 25:
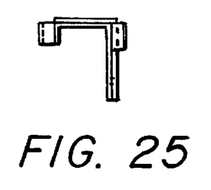
FIG. 25 is a top view of the second folder.
Figure 26:
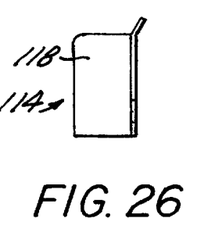
FIG. 26 is a front view of a top portion of the second folder.
Figure 27:
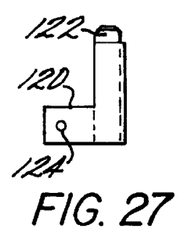
FIG. 27 is a side view of the top portion.
Figure 28:
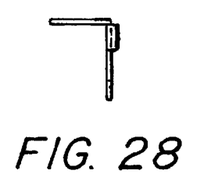
FIG. 28 is a top view of the top portion.

FIGS. 21 and 22 are front and side views of the second folder assembly 44. The second folder assembly is similar to the first folder assembly 42 and the common components are not described. The second folder assembly includes a second folder 112 which is different than the first folder 94 described above. FIGS. 23–25 are front, side and top views, respectively, of the second folder 112. The second folder is made up of a top portion 114 and a bottom portion 116. FIGS. 26–28 are front, side and top views, respectively, of the top portion 114. The top portion 112 is made up of a right angled member 118 including a mounting extension 120 and a guide tab 122. The mounting extension 120 includes a mounting hole 124 for connecting the first portion 114 to the second portion 116.

Figure 29:
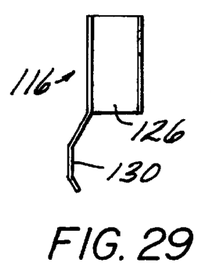
FIG. 29 is a front view of a bottom portion of the second folder.
Figure 30:
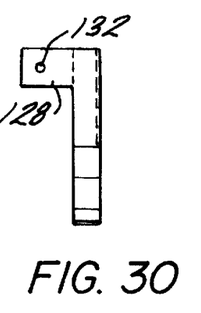
FIG. 30 is a side view of the bottom portion.
Figure 31:
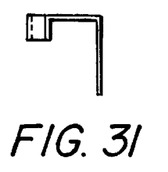
FIG. 31 is a top view of the bottom portion.
Figure 32:
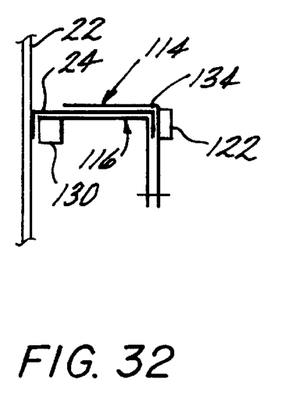
FIG. 32 is a top view of the first filter layer and the ribbon passing through the second folder.

FIGS. 29–31 are front, side and top views, respectively, of the bottom portion 116. The bottom portion 116 is made up of a right angled member 126 including a mounting extension 128 and a guide extension 130. A mounting hole 132 is provided in the mounting extension 128 to couple the bottom portion 116 to the top portion 114 using a fastener. FIG. 32 is a top view illustrating the partially completed filter passing through the second folder 112. As described above, the ribbon 24 has been welded to the first filter layer 22 at the first welder 40. When the top portion 114 and the bottom portion 116 are assembled, this forms a right angled channel 134. The ribbon 24 is positioned in the right angled channel 134 so that the second bent section 26 is formed. The guide extension 130 prevents the filter layer 22 or the ribbon 24 from contacting the anvil drive gear 90 or anvil drive belt 48. The unfastened end of ribbon 24 then passes over the anvil 36 in the second folder assembly and is welded to the second filter layer 20 at welding station 38.

Figure 33:
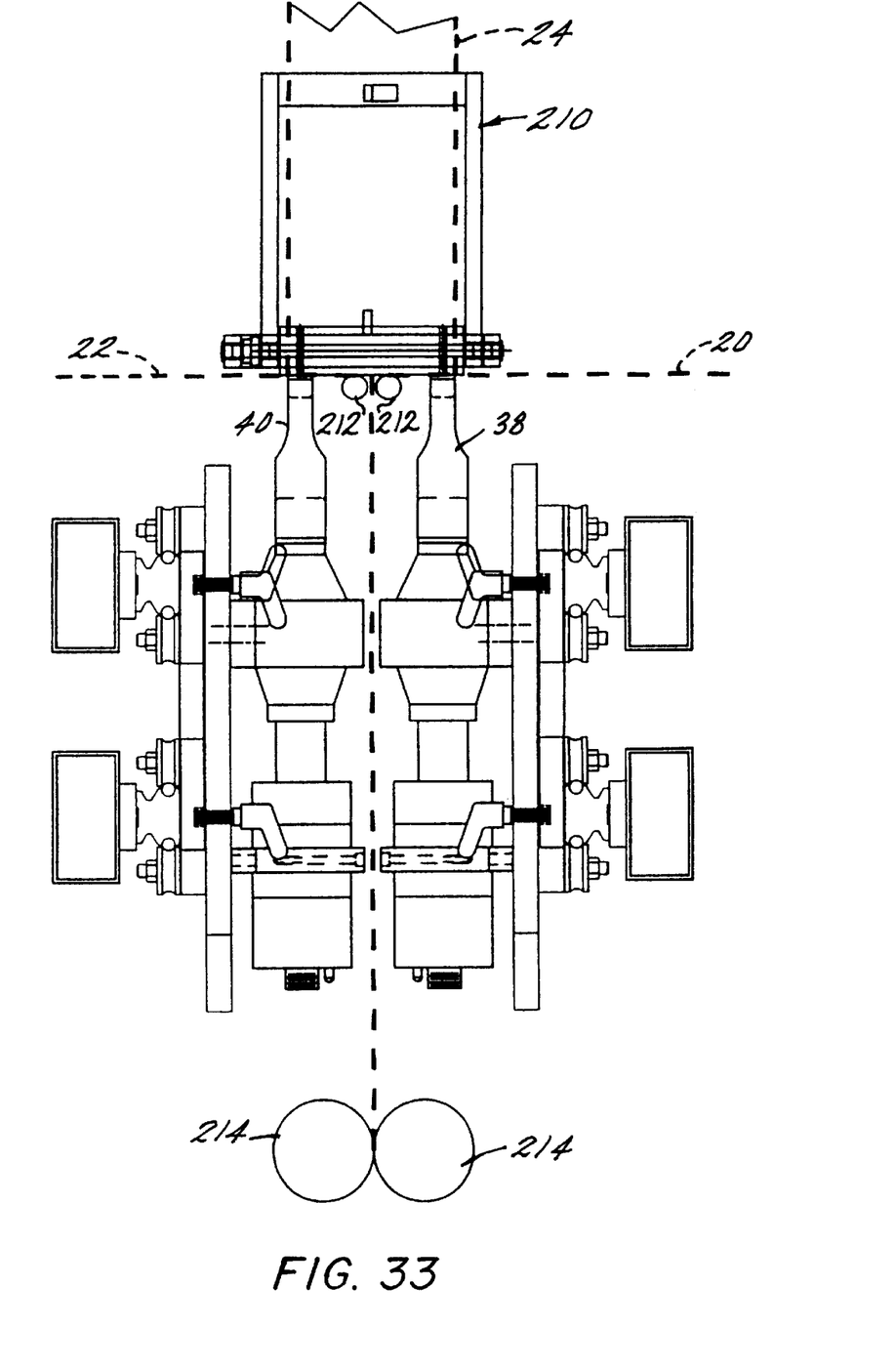
FIG. 33 is a front view of an apparatus for manufacturing the filter shown in FIG. 4 in an alternative embodiment.

FIG. 33 is a front view of an alternative apparatus for manufacturing the filter shown in FIG. 4. In this embodiment, the ribbon 24 is placed flat on the first filter layer 22 and the second filter layer 20 by a carriage 210. The first filter layer 22 and the second filter layer 20 are positioned in a plane. The ribbon 24 is then positioned on the first and second filter layers and the ends of the ribbon 24 are ultrasonically welded to the first and second filter layers. The ultrasonic welders 38 and 40 are perpendicular to the plane defined by the first and second filter layers 22 and 20. Once the welding is complete along the length of the first and second filter layers, the combined first filter layer 22, second filter layer 20 and ribbon 24 are drawn through rollers 212 by drive rollers 214 that grasp the assembled filter.

Figure 34:
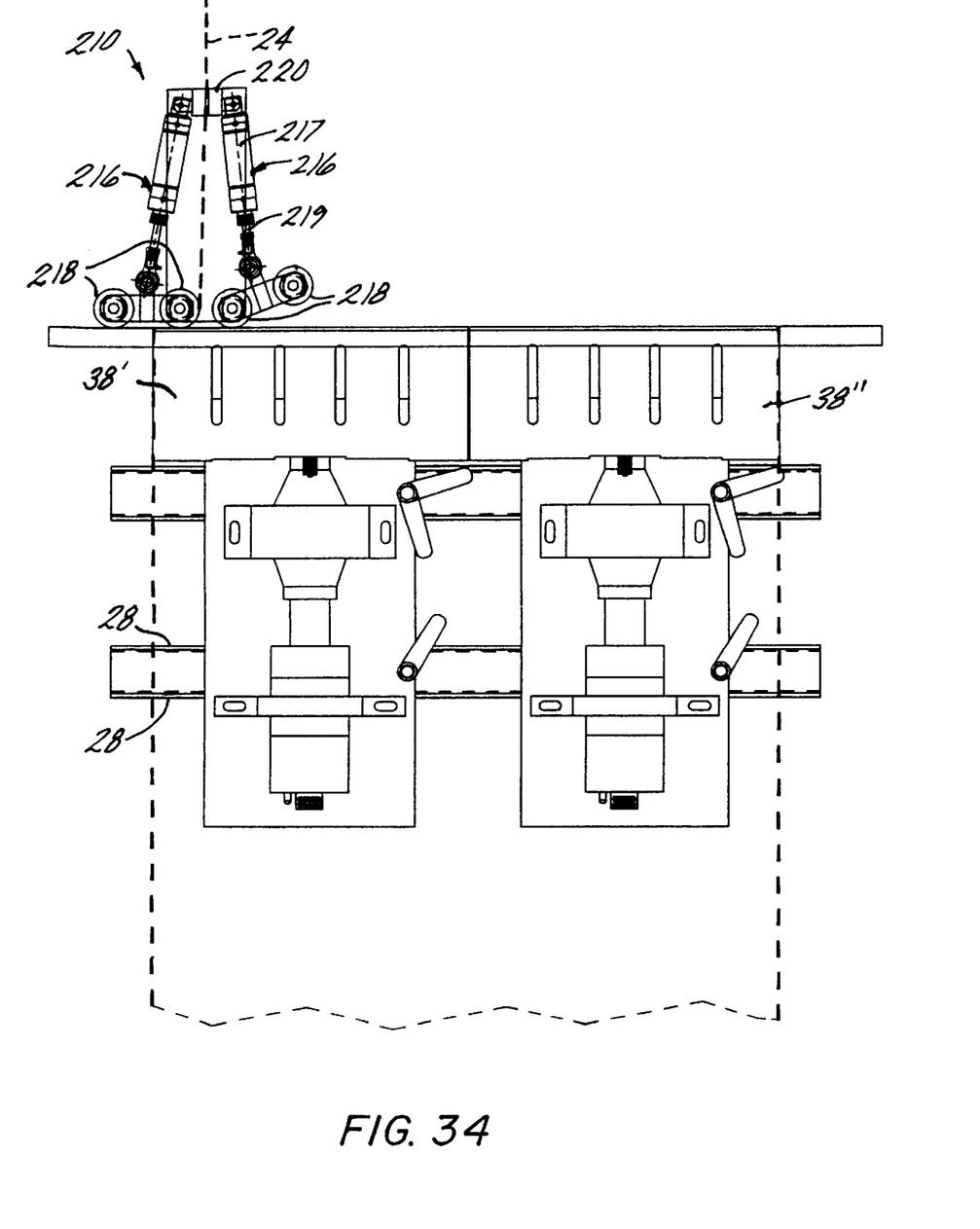
FIG. 34 is a side view of the apparatus shown in FIG. 33.

FIG. 34 is a side view of the apparatus shown in FIG. 33. As shown in FIG. 34, the carriage 210 includes two legs 216. At the end of each leg is a pair of rollers 218 rotatably mounted to the leg 216. The legs 217 are rotatably mounted to a carriage block 220 and include a cylinder 217 and an extension 219. As pressure is applied to the cylinder (e.g. pneumatic, hydraulic), the extension 219 moves out of the cylinder press the ribbon, the first filter layer and the second filter layer against the welders 38 and 40. As the carriage block 220 moves, one set of the rollers 218 presses the ribbon 24 against the first filter layer 22 and the second filter layer 20. The welder 38 is made up of two welding devices 38' and 38". The welder 40 is similarly made up of two welding devices. The two welding devices 38' and 38" extend along the entire width of the filter layers. As the ribbon is placed by moving the carriage in a first direction across the width of the filter layers, the welders 38 and 40 are activated and attach the ribbon 24 to the first filter layer 22 and the second filter layer 20. The carriage remains in position and the drive rollers 214 are activated and move the first filter layer 22 and the second filter layer 20 a predetermined distance. The carriage then moves in a second direction, opposite to the first direction, across the width of the filter layer placing the ribbon 24 flat against the first filter layer and the second filter layer and the welding procedure is repeated. The carriage 210 continues traveling back and forth until the manufacturing process is complete.

The air filter of the present invention eliminates the use of adhesives found in conventional filters and simplifies manufacturing of the filter through automation. The apparatus for manufacturing the filter includes separate welding stations for each end of the ribbon and quickly connects the filter layers to the ribbon. The result is a filter material, which may be formed into filter bags, having a reduced cost due to the improved manufacturing process.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of forming a filter comprising:
   (a) feeding a first sheet material and a second sheet material spaced from one another and with a major surface of each sheet material facing one another;
   (b) feeding at least one ribbon oriented to intersect said major surface of each sheet material; and
   (c) bonding each said sheet material to said ribbon while maintaining said first and second sheet materials spaced from one another.

2. A method of forming a filter as claimed in claim 1 wherein said feeding of said at least one ribbon includes folding said at least one ribbon into an elongated u-shape and said bonding is on longitudinal lengths of said elongated u-shape.

3. A method of forming a filter as claimed in claim 2 wherein said folding and bonding are carried out for each longitudinal edge of said u-shape in first and second folding and bonding operations.

4. A method of forming a filter as claimed in claim 1 wherein said feeding said at least one ribbon includes said at least one ribbon engaging an anvil disposed between two ultrasonic bonding apparatuses.

5. A method of forming a filter as claimed in claim 1 wherein said first sheet material and said second sheet material are maintained in spaced relationship by feeding respective sheet materials over respective rollers in spaced relationship to one another.

6. A method of forming a filter as claimed in claim 1 wherein said at least one ribbon comprises a plurality of ribbons in a spaced relationship with one another.

7. A method of forming a filter as claimed in claim 6 wherein said feeding said at least one ribbon includes said plurality of ribbons engaging a plurality of anvils disposed between corresponding pairs of bonding apparatuses.

8. A method of forming a filter as claimed in claim 3 wherein said first folding and bonding operations comprise:
   a) feeding said at least one ribbon through a first folder;
   b) engaging a first anvil with the folded ribbon;
   c) urging said first anvil against a first bonder while pinching said first sheet material and said at least one ribbon between said first anvil and said first sheet material to said at least one ribbon; and
   d) bonding said first sheet material to said at least one ribbon.

9. A method of forming a filter as claimed in claim 8 wherein second folding and bonding operations comprise:
   a) feeding said at least one ribbon through a second folder;
   b) engaging a second anvil with the folded ribbon;
   c) urging said second anvil against a second bonder while pinching said second sheet material and said at least one ribbon between said second anvil and said second sheet material; and
   d) bonding said second sheet material to said at least one ribbon.

10. A method of forming a filter as claimed in claim 1 wherein said feeding of said first and second sheet materials is initially substantially horizontal feeding and is translated over respective rollers to substantially vertical feeding and said feeding of said ribbon is substantially transverse to said initial feeding of said first and second sheet materials.

11. A method of forming a filter as claimed in claim 8 wherein said bonding is carried out by an ultrasonic bonder.

12. A method of forming a filter as claimed in claim 9 wherein said bonding is carried out by an ultrasonic bonder.

13. A method of forming a filter as claimed in claim 1 wherein said bonding is ultrasonic bonding.

14. A method of forming a filter comprising:
   a) feeding a first sheet material over a first fixed position roller;
   b) feeding a second sheet material over a second fixed position roller in spaced relation with said first fixed position roller;
   c) bending a ribbon into an elongated longitudinal generally u-shape;
   d) feeding said ribbon between said first sheet material and second sheet material;
   e) engaging said ribbon with an anvil;
   f) bringing said u-shaped ribbon on said anvil into contact with each of said first sheet material and said second sheet material; and
   g) ultrasonically bonding said first sheet material to said ribbon and said second sheet material to said ribbon.

15. A method of forming a filter as claimed in claim 14 wherein said first sheet material and said second sheet material are maintained in a substantially parallel condition relative to one another.

* * * * *

UNITED STATES PATENT AND TRADEMARK OFFICE
CERTIFICATE OF CORRECTION

PATENT NO. : 5,846,360

DATED : December 8, 1998

INVENTOR(S) : George Gil

It is certified that error appears in the above-identified patent and that said Letters Patent is hereby corrected as shown below:

Column 5, line 64, delete "217" and insert therefor --216--.

Signed and Sealed this

Twenty-eighth Day of March, 2000

Attest:

Q. TODD DICKINSON

*Attesting Officer*    *Commissioner of Patents and Trademarks*